United States Patent [19]

Carr et al.

[11] Patent Number: 5,242,185
[45] Date of Patent: Sep. 7, 1993

[54] SHALLOW NOSE PLATFORM TRAILER

[75] Inventors: Kimm L. Carr, Clinton; Donald W. Ray, Helenwood, both of Tenn.

[73] Assignee: Fruehauf Trailer Corporation, Southfield, Mich.

[21] Appl. No.: 848,363

[22] Filed: Mar. 9, 1992

[51] Int. Cl.$^5$ .............................................. B62D 21/02
[52] U.S. Cl. .............................. 280/423.1; 280/789; 280/799; 296/181
[58] Field of Search ...................... 280/423.1, 638, 656, 280/789, 796, 799, 800, 795, 400; 296/181–183, 204

[56] References Cited

U.S. PATENT DOCUMENTS

| | | | |
|---|---|---|---|
| 2,525,281 | 10/1950 | Anderson et al. | 280/795 |
| 2,622,895 | 12/1952 | Larsen | 280/789 |
| 2,791,439 | 5/1957 | Swanson | 280/799 X |
| 3,185,519 | 5/1965 | Turnbull et al. | 296/28 |
| 3,319,393 | 5/1967 | Tantlinger et al. | 52/496 |
| 3,598,421 | 8/1971 | Mason, Jr. | 280/423.1 |
| 3,705,732 | 12/1972 | Marinelli | 280/106 |
| 4,015,858 | 4/1977 | Love | 280/656 |
| 4,049,285 | 9/1977 | Chieger | 280/106 |
| 4,151,802 | 5/1979 | Miller et al. | 105/423 |
| 4,787,669 | 11/1988 | Wante | 296/182 |
| 4,938,524 | 7/1990 | Straub et al. | 296/182 X |
| 5,143,418 | 9/1992 | Fouquet | 296/182 |

*Primary Examiner*—Margaret A. Focarino
*Assistant Examiner*—Victor E. Johnson
*Attorney, Agent, or Firm*—Willian Brinks Olds Hofer Gilson & Lione

[57] ABSTRACT

A shallow nose platform trailer provides improved load carrying capability due to its reduced platform height and thus increased volume capability. The trailer includes a pair of parallel, longitudinal main I-beams and a pair of channel beam side rails defining a height of about three and one-half inches (89 mm) at the forward portion of the trailer adjacent the kingpin. The webs and lower flanges of the I-beams curve downwardly to the rear and define a height of approximately twenty-five inches (635 mm) along the central and rear portion of the trailer. An apron plate extending between the forward portions of the I-beams carries and disperses the forces imposed on the trailer and longitudinal I-beams by the kingpin and fifth wheel. The apron plate defines a V-shaped notch at its rear. A plurality of transverse beams support a deck having an upper surface flush with the longitudinal I-beams and side rails.

20 Claims, 3 Drawing Sheets

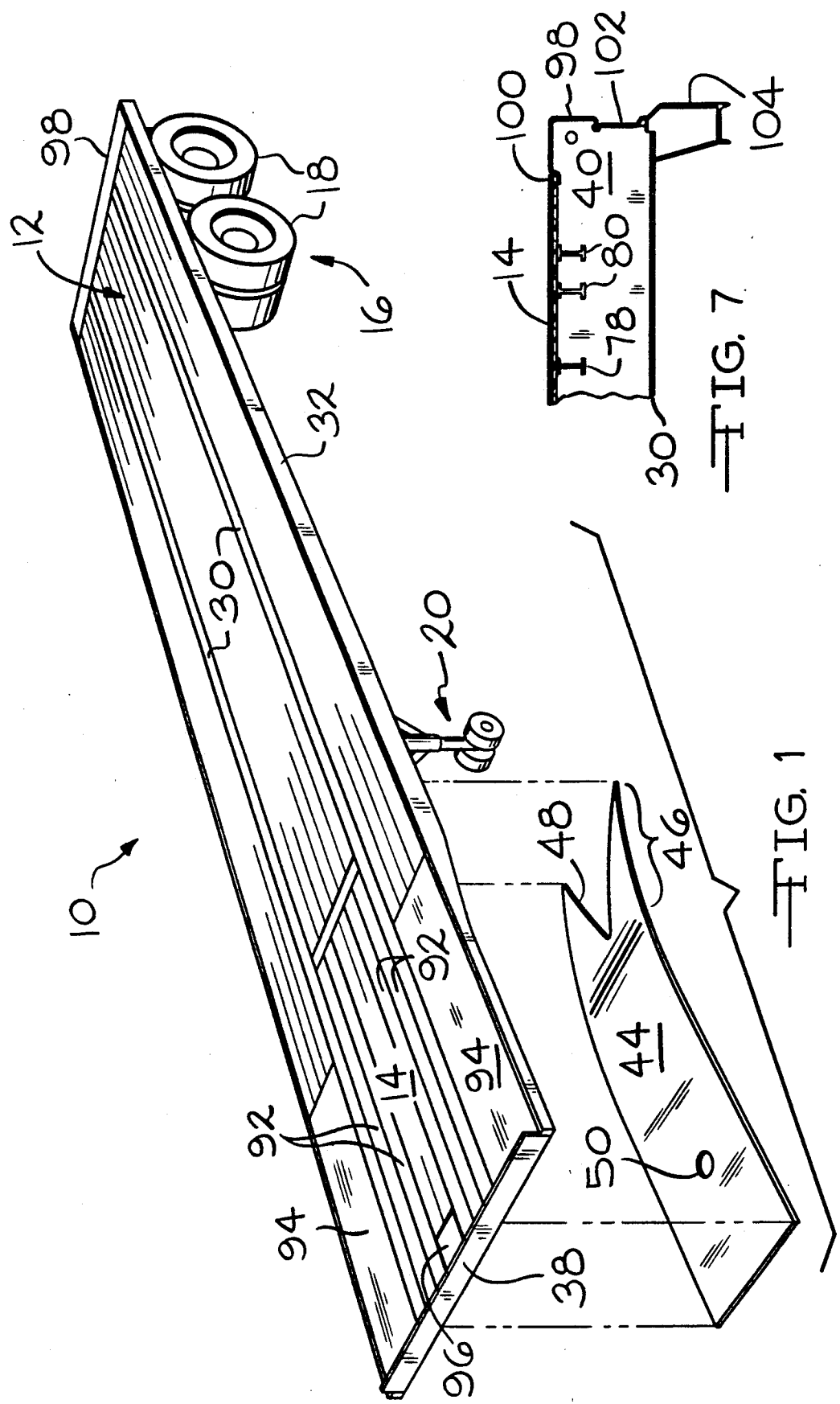

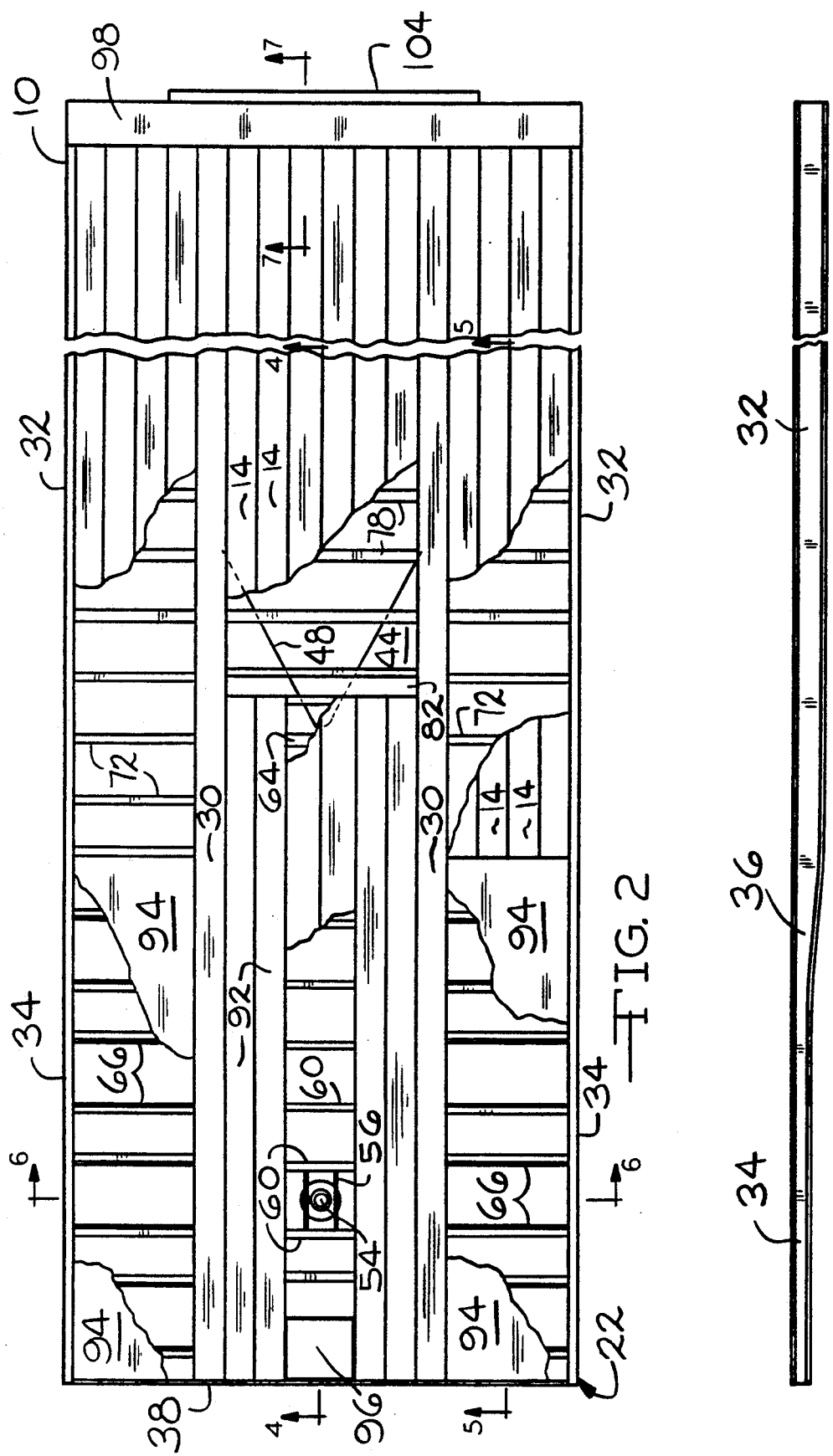

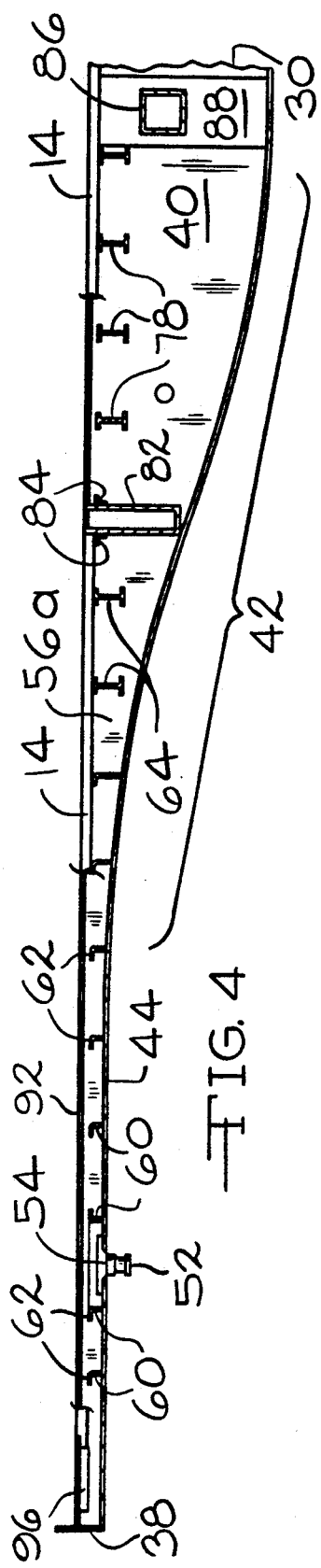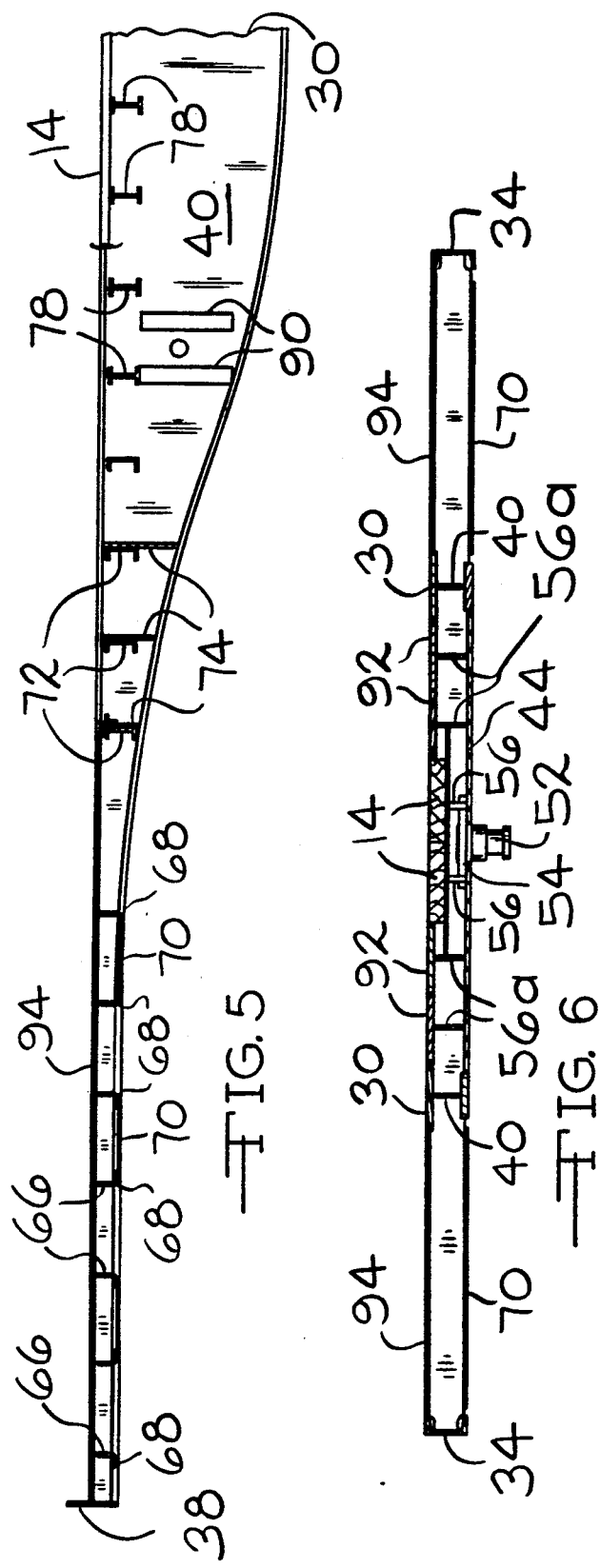

SHALLOW NOSE PLATFORM TRAILER

BACKGROUND OF THE INVENTION

This invention relates generally to a platform, that is, flatbed trailers, and more specifically to a platform trailer having a shallow nose construction which reduces the platform height and thus permits an increase in the overall carrying capacity of a trailer.

Generally speaking, platform trailers are trailers defining an elongate horizontal platform supported upon one or more axles which lack rigid or permanent sidewalls. Such trailers are particularly useful for larger and irregularly shaped goods, material or products which do not require complete protection from the elements and, with the addition of temporary sidewalls fabricated, for example, of canvas, lightweight, high volume material. One of the major design criteria of the platform trailer is the necessity to provide all structural strength and rigidity in the substructure inasmuch as there is no superstructure above the platform to distribute loads and forces or serve as a rigidifying structure.

A typical platform trailer is disclosed in U.S. Pat. No. 3,185,519. Here, a pair of centrally disposed, spaced-apart longitudinal main rails are interconnected by a plurality of transversely extending cross rails. The main rails are formed with vertically corrugated center portions between upper and lower flanges. These structures support the platform of the trailer.

U.S. Pat. No. 3,319,393 teaches another flatbed trailer construction having a plurality of longitudinally extending beams which include an upper hat-shaped member. These beams and hat-shaped members form a portion of the trailer bed and a shoulder or lip for receiving planks which form adjacent portions of the trailer platform.

The trailer construction of U.S. Pat. No. 3,705,732 incorporates a combined vehicle frame and load bed construction. In this trailer, a pair of parallel spaced-apart main I-beams are coupled by pluralities of transversely extending beam members by L-shaped brackets and rivets. A plurality of elongated side-by-side decking sections disposed on the transverse brace members form the platform of a trailer.

In U.S. Pat. No. 4,049,285 a platform trailer is assembled from a plurality of longitudinally extending extruded aluminum floor boards. The floor boards include triangular web bracing and define a maximum thickness at the center of the trailer and a minimum thickness of approximately two and one-half inches (63 mm) at the side edges of the trailer.

U.S. Pat. No. 4,151,802 relates to a load bearing, post-free sidewall and bottom rail construction for a trailer. The design includes insulating means between the inner and outer sidewalls and a bottom rail which is coupled to said sidewalls and is configured to transmit substantially equal loads to the spaced inner and outer sidewalls.

SUMMARY OF THE INVENTION

A shallow nose platform trailer provides improved load carrying capability due to its reduced platform height and thus increased volume capability. The trailer includes a pair of parallel, longitudinal I-beams and a pair of channel beam side rails which extend about three and one-half inches (89 mm) vertically at the forward portion of the trailer adjacent the kingpin. The web and lower flange of the I-beams curve downwardly in a reverse curve configuration to the rear and defines a height of approximately twenty-five inches (635 mm) along the central and rear portion of the trailer. An apron plate which follows the reverse curve of the lower flanges of the I-beams carries and disperses the forces imposed on the trailer and longitudinal I-beams by the kingpin and fifth wheel. The apron plate defines a symmetrically dispersed V-shaped notch at its rear. The side rails are coupled to the I-beams by a plurality of transverse braces. The bed of the trailer comprehends a plurality of longitudinally oriented floor boards supported by the transverse braces disposed between the two I-beams and the side rails.

It is thus an object of the instant invention to provide a platform trailer having an exceptionally shallow nose.

It is a further object of the present invention to provide a platform trailer having reduced platform height which permits increased trailer volume.

It is the still further object of the present invention to provide a platform trailer which is strong and relatively lightweight and having a design which readily adapts itself to manufacture.

Further objects and advantages of the present invention will become apparent by reference to the following description and appended drawings.

BRIEF DESCRIPTION OF THE DRAWINGS

FIG. 1 is a perspective view of a shallow nose trailer according to the present invention with the apron plate dropped down for purposes of illustration;

FIG. 2 is a fragmentary, top plan view of a shallow nose trailer according to the present invention with portions broken away;

FIG. 3 is a fragmentary, side elevational view of a side rail utilized on a shallow nose trailer according to the present invention in pre-assembly configuration;

FIG. 4 is a fragmentary, full sectional view of a shallow nose trailer according to the present invention taken along line 4—4 of FIG. 2;

FIG. 5 is a fragmentary, full sectional view of a shallow nose platform trailer according to the present invention taken along line 5—5 of FIG. 2;

FIG. 6 is a full, sectional view of a shallow nose platform trailer according to the present invention taken along line 6—6 of FIG. 2, and FIG. 7 is a fragmentary, enlarged view of the rear portion of a shallow nose platform trailer according to the present invention.

DESCRIPTION OF THE PREFERRED EMBODIMENT

Referring now to FIG. 1, a shallow nose trailer according to the present invention is illustrated and designated by the reference numeral 10. The shallow nose trailer 10 defines an elongate platform or deck 12 assembled from a plurality of longitudinally oriented wood planks 14. The wood planks 14 may be solid apitong or keruing or plywood made from these or other similarly tough and weather resistant woods or other suitable material. Typically, a tandem axle suspension assembly 16 including a plurality of road engaging wheels 18 supports the trailer 10. Typically, as well, the trailer 10 includes a conventional landing gear assembly 20. The deck 12, the suspension assembly 16 and the landing gear assembly 20 are all positioned by and secured to a frame assembly 22 which includes a plurality of longitudinally and transversely disposed components.

Turning now to FIGS. 2 and 3, the frame assembly 22 includes a pair of spaced apart main I-beams 30 which extend substantially the full length of the trailer 10 and function as the two primary load bearing and distributing members. The main I-beams 30 will be described below in greater detail with reference to FIGS. 4 and 5.

The left and right longitudinally extending edges of the trailer 10 are defined by a pair of side rails 32. Each of the side rails 32 are U-shaped, i.e., channel beams, in cross section and are oriented in mirror-image configuration as illustrated in FIG. 6 with the parallel flanges of the side rails 32 disposed horizontally. The nominal height of the side rails 32 is preferably about six inches (152 mm). However, the forward regions 34 of the side rails 32 are narrowed or thinned to have a total height of approximately 3.5 inches (89 mm). These forward, narrow regions 34 may be achieved by cutting the (vertical) web of the side rails 32 parallel to the flange rearwardly and then in a reverse curve along the region 36. The lower flange of each of the side rails 32 may then be re-attached to the web by welding. Preferably, the forward, narrow regions 34 of the side rails 32 extend approximately eight feet (2.44 m) back from the front of the trailer 10. As will become apparent from the description of the main I-beams 30, below, the entire forward portion of the trailer 10 exhibits this reduced height or thickness of approximately 3.5 inches (89 mm) to achieve the above-stated objectives whereas greater height of the main I-beams 30 and the side rails 32 is utilized in the middle and rear portions of the trailer 10, as will be more fully explained below.

Referring now to FIGS. 2, 5 and 6, the forward terminus of the trailer 10 is defined by a vertical plate 38 to which the main I-beams 30 and side rails 32 are secured, preferably by welding. As noted above and as clearly apparent in FIGS. 4 and 5, the forward portion of the main I-beams 30 define a shallow nose having a height of approximately 3.5 inches (89 mm). This main I-beam 30 height is constant for approximately six feet (1.83 m) from the vertical plate 38. Beginning approximately six feet (1.83 m) back from the front of the trailer 10, the web 40 and the lower flanges of the main I-beams 30 define a reverse curve 42. The reverse curves 42 of the lower flanges extend along approximately ten feet (3 m) such that the main I-beams 30 define a vertical height of approximately twenty-five inches (635 mm), sixteen feet (4.88 m) back from the front of the trailer 10 defined by the front plate 38. The reverse curve 42 is a transition region between the shallow nose of the main I-beams 30 and the full height of the I-beams 30 at the central and rear portions of the trailer 10. This configuration permits a shallow trailer nose and thus lowered platform height which increases maximum interior space thereby enhancing cargo capacity, provides clearance for the tractor and provides the necessary overall structural integrity to the trailer 10.

Extending from the front plate 38 toward the rear of the trailer 10 and disposed between and secured by weldment to the opposed inner edges of the lower flanges of the I-beams 30 is an apron plate 44 (also illustrated in FIG. 1). Preferably, the apron plate 44 is steel and defines a thickness of 0.375 inches (9.5 mm). The apron plate 44 conforms to the reverse curve 42 of the webs 40 and the lower flanges of the main I-beams 30 as illustrated in FIG. 4 and defines a dovetail region 46 at its end opposite the front plate 38. The dovetail region 46 defines a symmetrically disposed V-shaped, i.e., triangular, notch 48 which functions as a stress reducer in this region of the trailer 10. The apron plate 44 also includes an aperture 50 disposed on the longitudinal center line of the plate 44 preferably about three feet (0.91 m) back from the front plate 38. The aperture 50 receives the kingpin 52. A mounting flange 54 integrally formed with the kingpin 52 is secured to the apron plate 44 by welding or other suitable fastening means. A plurality of parallel, spaced-apart longitudinally oriented bars 56 reinforce the nose of the trailer 10 transversely adjacent the kingpin 52. Specifically, a pair of the bars 56 are secured to the flange 54 of the kingpin 52 and in turn are secured to the apron plate 44 and a pair of spaced-apart transversely oriented angle, i.e., L-shaped, beams 60.

Additionally, two pairs of longer, parallel bars 56a are secured by weldment to and extend upwardly from the apron plate 44. The longer, parallel bars 56a extend longitudinally from the front plate 38 into the reverse curve 42.

As illustrated in FIG. 4, the angle beams 60 are but two of a plurality of transversely oriented, angle beams 60 which extend between the webs 40 of the main I-beams 30. The angle beams 60 are preferably secured to the webs 40 by welding. The angle beams 60 are oriented with a short horizontally extending leg 62 disposed below the top of the I-beams 30 and side rails 32 a distance equal to the thickness of the wood planks 14 such that the wood planks 14 may be disposed upon the horizontal legs 62 to produce a flat and level deck 12 flush with the upper surfaces of the main I-beams 30 and the side rails 32. Near the rear of the shallow nose portion of the trailer 10, angle beams 60 having a greater (taller) vertical section may be utilized and a pair of stub I-beams 64 which also extend between and are secured to the webs 40 of the main I-beams 30 are utilized still further back.

Turning now to FIGS. 2 and 5, on the left and right sides of the trailer 10 between the main I-beams 30 and the side rails 32 are disposed a plurality of angle beams 66 oriented in inverted fashion relative to the angle beams 60 discussed above. That is, the angle beams 66 are oriented such that they define horizontally disposed lower surfaces or legs 68. The angle beams 66 are arranged in opposed pairs and the lower surfaces 68 receive three anti-hook plates 70 on each side of the trailer 10. Transverse beams disposed between the webs 40 of the main I-beams 30 and the side rails 32 in the forward region of the reverse curve 42 are preferably channel beams 72 having gussets 74 at the ends secured to the webs 40 of the I-beams 30 which distribute forces from the channel beams 72 along the full height of the webs 40 of the main I-beams 30.

With reference now to FIGS. 4 and 5, it will be appreciated that from approximately the middle of the reverse curve 42 to the rear of the trailer 10 are disposed a plurality of transverse I-beams 78. Whereas the angle beams 60 and 66, the stub I-beams 64 and the channel beams 72 are arranged in transversely aligned groups of three disposed between the webs 40 of the pairs of main I-beams 30 and between the webs 40 of the main I-beams 30 and the side rails 32, each of the transverse I-beams 78 preferably extends the full width of the trailer 10, that is, from one of the side rails 32 to the opposite side rail 32.

In order to accommodate this configuration, I-shaped cutouts 80, illustrated in FIG. 7, are punched or cut in the webs 40 of the main I-beams 30. The cutouts 80 in the webs 40 of the main I-beams 30 are aligned such that the I-beams 78 will extend perpendicularly therethrough. The I-beams 78 are welded to the main I-beams 30 and the side rails 32. The transverse I-beams 78 (and cutouts 80) are spaced longitudinally along the full length of the trailer from the reverse curve 42 rearwardly and are likewise spaced below the upper surfaces of the main I-beams 30 and side rails 32 a distance equal to the thickness of the wood planks 14 such that when the wood planks 14 are disposed thereupon, a uniform and smooth deck 12 is formed which extends fully between and is flush with the side rails 32.

As illustrated in FIG. 4, disposed substantially medially along the length of the reverse curve 42, that is, approximately eleven feet (3.35 m) back from the front of the trailer 10 is a transversely oriented rectangular tube or box beam 82. The rectangular tube beam 82 extends between the main I-beams 32 and is secured to the webs 40 by weldments. The upper ends of the rectangular tube beam 82 are notched to receive the adjacent flange of the main I-beams 30 so that the upper surface is flush with and forms a portion of the deck 12 as is apparent by reference to FIG. 1. Angle brackets 84 secured to the rectangular tube beam 82 receive and support ends of the wood planks 14 and maintain them flush with the top of the tube beam 82, the main I-beams 30 and the side rails 32. Similarly disposed, that is, disposed between the main I-beams 30 though positioned just behind the end of the reverse curve 42 of the webs 40 and the lower flanges of the main I-beams 30 is a square tube 86. The square tube 86 extends between and is secured to the webs 40 of the main I-beams 30. A pair of doubler plates 88 secured to the opposed faces of the webs 40 reinforces the welded connection between the square tube 86 and the main I-beams 30.

As seen in FIG. 5, the outer faces of the webs 40 of the main I-beams 30 preferably include pairs of reinforcing angle brackets 90 for facilitating mounting of the landing gear 20 (illustrated in FIG. 1).

With reference now to FIGS. 2 and 6, it will be appreciated that a pair of longitudinally extending narrow metal plates 92 are disposed adjacent each of the inner edges of the main I-beams 30 and are supported by and secured by weldment to the longer, parallel bars 56a. The narrow plates 92 and the parallel bars 56a extend from the front plate 38 to the rectangular box beam 82. The narrow plates 92 and the parallel bars 56a cooperate to reinforce the nose of the trailer 10 and distribute loading and forces associated with the kingpin 52.

Both the left and right forward portions of the deck 12 are defined by a pair of rectangular plates 94 which are secured to the upper edges of the angle beams 66 by welding or other suitable means. The upper surfaces of the plates 94 are flush with the upper edges of the main I-beams 30 and the side rails 32. An access cover 96 on the longitudinal center line of the trailer 10 immediately behind the front plate 38 is removable and may be secured by threaded fasteners (not illustrated). The access cover 96 facilitates service to the air brake hoses, fittings and electrical connectors (all not illustrated) which are typically utilized and incorporated into a trailer such as the trailer 10 illustrated.

With reference now to FIGS. 2 and 7, it will be appreciated that the rear of the trailer 10 is defined by a transversely oriented right angle member 98 defining a lip 100 which receives and supports the wood planks 14. A vertical panel 102 depends from the right angle member 98 and includes a plurality of openings (not illustrated) which receive conventional running, brake and turn signal light assemblies. Certain state governments mandate bumper segments having a maximum ground clearance. Such a safety bumper 104 may be secured to the main I-beams 30 generally below the panel 102.

With regard to the general construction of the trailer 10 and specifically the frame assembly 22, it will be appreciated that the presently preferred material is steel and the presently preferred assembly technique is welding in conformance with current trailer fabrication practices. However, it should be understood that other materials such as aluminum and other fabrication and assembly techniques may be utilized as market conditions dictate and technology changes.

The trailer 10 may be adapted to transport various cargo by, for example, the incorporation of sockets to receive stakes for supporting removable walls, tie-downs to assist securement of cargo and other standard trailer components. The increase in maximum interior volume of an enclosed trailer achieved by lowering the platform has particular application when transporting lightweight, i.e., low density, material such as aluminum scrap, sawdust and the like.

The foregoing disclosure is the best mode devised by the inventors for practicing this invention. It is apparent, however, that devices incorporating modifications and variations will be obvious to one skilled in the art of trailer vehicles. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

We claim:
1. A shallow nose trailer comprising, in combination,
  a pair of longitudinally disposed, spaced-apart I-beams each having a web and a lower flange, said I-beams each including a forward region of a first height and a rearward region of a second, greater height,
  a pair of side rails disposed longitudinally and adjacent said pair of I-beams,
  a plurality of transversely oriented, spaced-apart beams extending between said side rails,
  a platform supported by said transversely oriented beams, and
  an apron plate secured between said lower flanges of said forward regions of said I-beams.
2. The shallow nose trailer of claim 1 wherein said trailer includes a front and said apron plate extends from said front toward said rearward region.
3. The shallow nose trailer of claim 2 wherein said apron plate includes an end and said end adjacent said rearward region includes a triangular notch.
4. The shallow nose trailer of claim 2 wherein said apron plate defines an opening and further includes a kingpin disposed in said opening and secured to said apron plate.
5. The shallow nose trailer of claim 1 wherein a portion of said transversely oriented beams are I-beams and said pair of longitudinally disposed I-beams define complementary I-shaped openings for receiving said portion of said transversely oriented beams.
6. The shallow nose trailer of claim 1 wherein a portion of said transversely oriented beams define an L-shape in cross section and are disposed in aligned groups of three extending between said side rails.
7. The shallow nose trailer of claim 1 wherein said side rails define a first, forward region having a first height and a second, rearward region having a second, greater height.

8. The shallow nose trailer of claim 7 wherein said first height of said pair of longitudinally disposed I-beams is equal to said first height of said side rails.

9. The shallow nose trailer of claim 1 further including a pair of box beams transversely disposed between said pair of longitudinally disposed I-beams.

10. The shallow nose trailer of claim 1 wherein said platform includes a pair of plates, each of said pair of plates disposed between one of said side rails and said forward region of one of said I-beams.

11. The shallow nose trailer of claim 1 further including wheel means for facilitating translation of said trailer on a surface.

12. A shallow nose trailer comprising, in combination,
   a pair of longitudinally disposed, spaced-apart I-beams each having a web and a lower flange, said I-beams defining a forward region of a first height, a rearward region of a second, greater height and a transition region between said forward region and said rearward region,
   a pair of outside rails disposed longitudinally and adjacent said pair of I-beams,
   a plurality of transversely oriented, spaced-apart beams extending between said side rails,
   a platform disposed on said transversely oriented beams, and
   an apron plate secured between said lower flanges of said forward regions of said I-beams.

13. The shallow nose trailer of claim 12 wherein said trailer includes a front and said apron plate has a first end disposed adjacent said front and a second end disposed in said transition region.

14. The shallow nose trailer of claim 13 wherein said second end of said apron plate includes a triangular notch.

15. The shallow nose trailer of claim 12 wherein said side rails define a first, forward region having a first height and a second, rearward region having a second, greater height.

16. The shallow nose trailer of claim 12 further including a pair of box beams disposed between said pair of longitudinally disposed I-beams.

17. The shallow nose trailer of claim 13 further including a pair of box beams transversely disposed between said pair of box beams transversely disposed between said pair of longitudinally disposed I-beams, one of said pair of box beams disposed forward of the second end of said apron plate and the other of said box beams is disposed rearward of the second end of said apron plate.

18. A shallow nose trailer having a front comprising, in combination,
   a pair of longitudinally disposed, spaced-apart I-beams each having an upper flange, a lower flange and a web, said I-beams defining a forward region of a first height and a rearward region of a second, greater height,
   a pair of outside rails disposed longitudinally and adjacent said pair of I-beams,
   a plurality of transversely oriented, spaced-apart beams extending between said side rails,
   a platform disposed on said transversely oriented beams,
   an apron plate secured to and extending from said front between said lower flanges of said I-beams, and
   a pair of box beams disposed transversely between said longitudinal I-beams.

19. The shallow nose trailer of claim 18 further including a reverse curved transition region between said forward region and said rearward region of said longitudinally disposed I-beams, wherein said apron plate has a first end at said front and a second end adjacent said transition region and wherein one of said pair of box beams is disposed forward of said second end of said apron plate and the other of said pair of box beams is disposed rearward of the second end of said apron plate.

20. The shallow nose trailer of claim 18 wherein said apron plate includes a triangular notched end and a kingpin.

* * * * *